(12) United States Patent
Roberts, Jr.

(10) Patent No.: US 8,562,924 B1
(45) Date of Patent: Oct. 22, 2013

(54) CONTROL OF NO/NOX RATIO TO IMPROVE SCR EFFICIENCY FOR TREATING ENGINE EXHAUST

(71) Applicant: Southwest Research Institute, San Antonio, TX (US)

(72) Inventor: Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/656,672

(22) Filed: Oct. 20, 2012

Related U.S. Application Data

(60) Provisional application No. 61/667,307, filed on Jul. 2, 2012.

(51) Int. Cl.
*B01D 53/56* (2006.01)
*B01D 53/94* (2006.01)
*F01N 3/10* (2006.01)
*F01N 3/24* (2006.01)

(52) U.S. Cl.
USPC ............ 423/213.2; 423/213.5; 423/213.7; 60/299; 60/301

(58) Field of Classification Search
USPC ............ 423/213.2, 213.5, 213.7; 60/299, 301
See application file for complete search history.

(56) References Cited

U.S. PATENT DOCUMENTS

| | | | |
|---|---|---|---|
| 7,810,316 B2 * | 10/2010 | Salemme et al. | 60/288 |
| 2009/0031711 A1 * | 2/2009 | Braun et al. | 60/297 |
| 2009/0169451 A1 * | 7/2009 | Andreasson et al. | 423/213.2 |
| 2010/0139246 A1 * | 6/2010 | Andersson et al. | 60/276 |
| 2010/0221161 A1 * | 9/2010 | Schneider et al. | 423/213.5 |

OTHER PUBLICATIONS

U.S. Appl. No. 13/539,654 entitled Control of NO/NOx Ratio to Improve SCR Efficiency for Treating Engine Exhaust Using Bypass Oxidation Catalyst, filed Jul. 2, 2012.

* cited by examiner

*Primary Examiner* — Timothy Vanoy
(74) *Attorney, Agent, or Firm* — Chowdhury & Georgakis PC; Ann C. Livingston

(57) ABSTRACT

Methods and systems for treating NOx-containing exhaust from an internal combustion engine. An exhaust aftertreatment system has at least a PM control device and a downstream selective reduction catalyst (SCR) device. By using a bypass line to divert engine-out exhaust around the PM control device, or by introducing NO or NO2 from a non-engine source, the NO/NOx ratio into the SCR device can be controlled to a desired ratio for improved SCR efficiency.

12 Claims, 3 Drawing Sheets

CONTROL OF NO/NOx RATIO TO IMPROVE SCR EFFICIENCY FOR TREATING ENGINE EXHAUST

PRIORITY TO PROVISIONAL PATENT APPLICATION

This patent application claims the filing benefit of U.S. Provisional Application No. 61/667,307, filed Jul. 2, 2012.

TECHNICAL FIELD OF THE INVENTION

This invention relates to exhaust aftertreatment of exhaust from diesel (lean burn) engines, and more particularly to aftertreatment of exhaust that contains NOx.

BACKGROUND OF THE INVENTION

Despite new technologies that significantly aid in reducing exhaust emissions from internal combustion diesel engines, NOx and particulate matter (PM) emissions are still a subject of environmental concern. The term "NOx" includes the mono-nitrogen oxides NO and NO2 (nitric oxide and nitrogen dioxide). NOx is a particular concern for diesel engines because of their lean burn operation, but some gasoline engines include lean burn operation as well.

Emission standards for vehicle engines are becoming increasingly stringent, and it is difficult to meet governmental emissions regulations by merely relying only on improvements to the engine itself. Thus, today's engines continue to require some sort of exhaust gas aftertreatment system.

For diesel and other lean burn engines, various exhaust aftertreatment devices have played an essential role in engine emission technologies. Diesel particulate filters (DPF's) are used for particulate matter (PM) control. Selective catalytic reduction (SCR) devices, lean NOx traps and NOx adsorbers are used for NOx control.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a bench test of an SCR device, showing NH3 emitted from the device.

DETAILED DESCRIPTION OF THE INVENTION

The following description is directed to various embodiments of an exhaust aftertreatment system for reducing NOx and PM emissions. These embodiments are especially suitable for diesel internal combustion engines, but may also be suited for lean burn gasoline engines or any other engine that produces NOx in its exhaust. Although the description is in terms of an exhaust aftertreatment system of a type used for automotive vehicles, the exhaust aftertreatment system may be used to treat exhaust from any type of lean burn engine.

As indicated in the Background, many modern diesel internal combustion engines use selective catalytic reduction (SCR) devices for NOx reduction. An SCR is a device that uses a catalyst to convert NOx into nitrogen (N2) and water (H2O). A reductant, such as anhydrous ammonia, aqueous ammonia or urea, is added to the exhaust gas to activate the catalyst, typically by means of an injector upstream the SCR device. It is desired that the NOx conversion efficiency of the SCR device as high as possible.

A feature of the systems and methods described herein is the recognition that that the NOx conversion efficiency of an SCR device is a strong function of the NO/NOx ratio in the exhaust stream that enters the SCR (sometimes referred to herein as the "feedgas"). The following description is directed to controlling the NO/NOx ratio of the feedgas so that NOx reduction efficiency is maximized. This control is achieved in real time or near real time.

Figure 1:
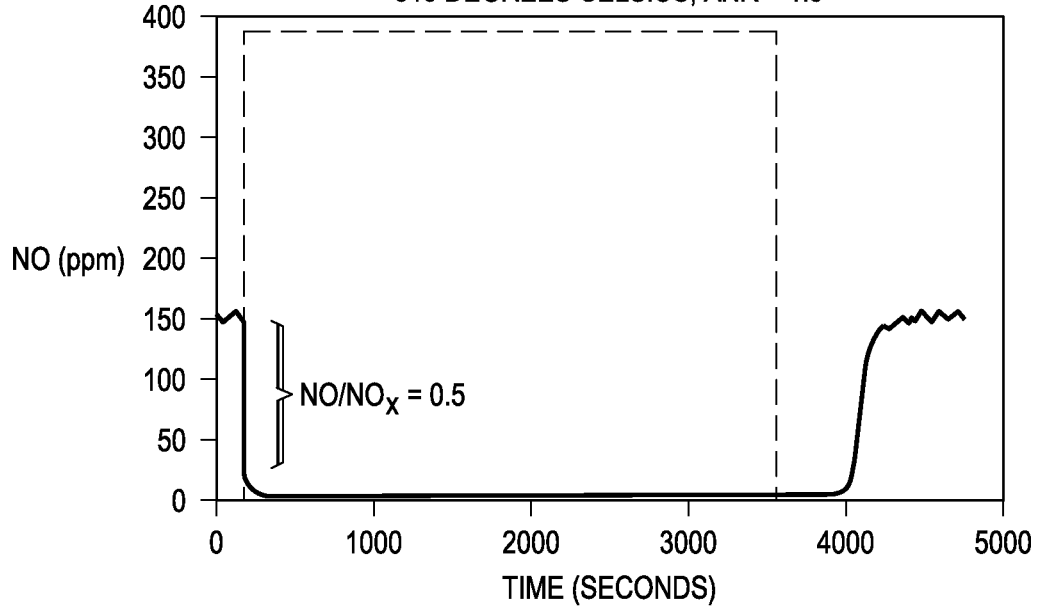
FIG. 1 illustrates a bench test of an SCR device, showing NO emitted from the device.
Figure 2:
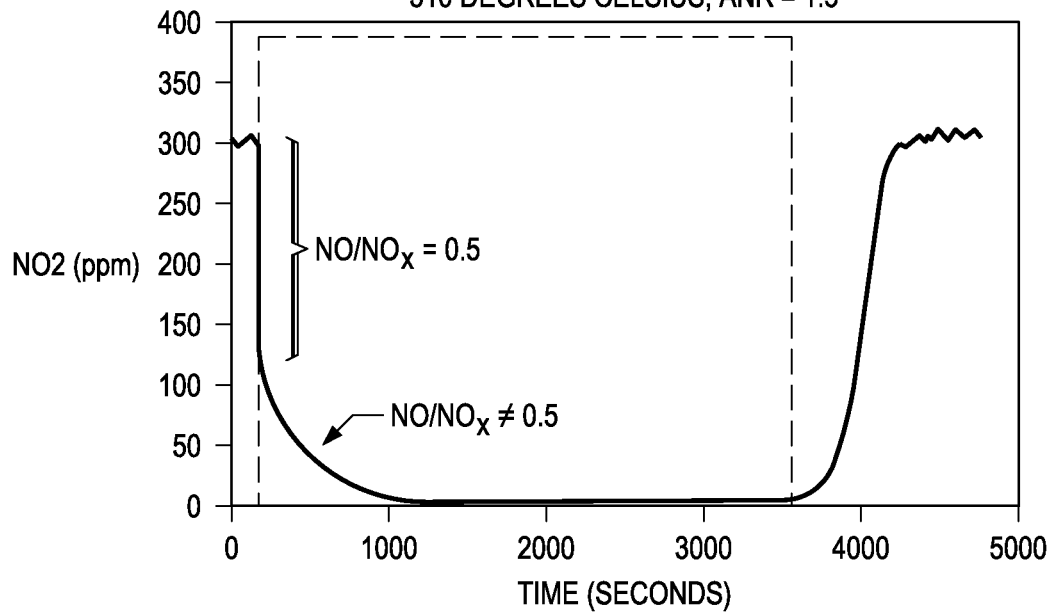
FIG. 2 illustrates a bench test of an SCR device, showing NO2 emitted from the device.
Figure 3:
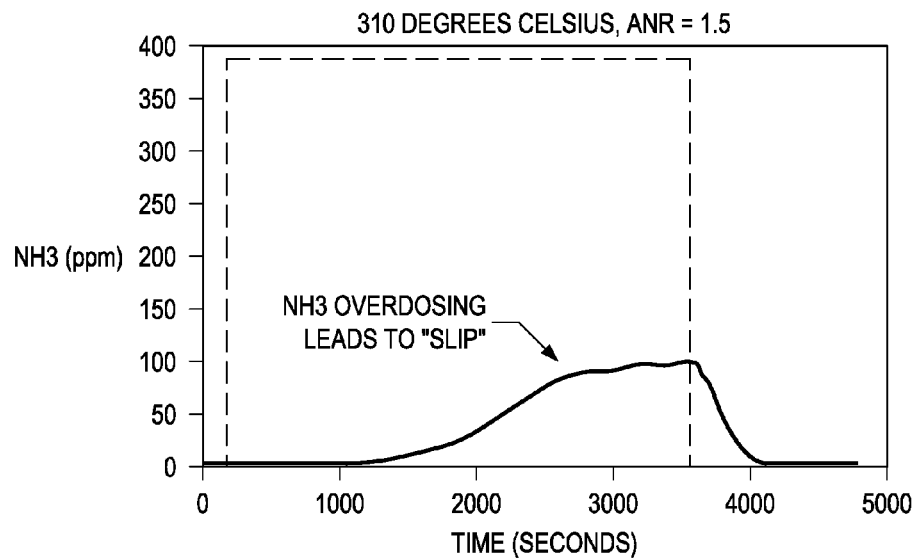

FIGS. 1-3 illustrate an example of the measured NOx conversion performance of an example SCR device. These figures are based upon bench tests, where known flow rates and concentrations of NO and NO2 were supplied to the SCR device to simulate an SCR receiving exhaust from a diesel engine. During these tests, ammonia (NH3) was also supplied to the SCR device.

In FIGS. 1-3, the mid-bed temperature of the SCR device was 310 degrees Centigrade, and the ammonia-to-NOx ratio (ANR) was 1.5. Although ANR=1.5 is considered "overdosing", in practice, SCR devices are often overdosed, so that maximum NO and NO2 reductions are obtained. However, as explained below, the methods described herein should allow ammonia overdosing to be reduced, because the controlled NO/NOx ratio should result in faster and more complete NO and NO2 reduction.

In FIGS. 1 and 2, the rapid decrease in NO and NO2 early in each test occurs when ammonia is provided to the SCR device. The first vertical line indicates when ammonia delivery was turned off. When ammonia is turned off, NO2 breaks through first, and builds to steady state as all ammonia is consumed. The second vertical line indicates the return of NO to its initial concentration.

At the early step-change in NO and NO2 concentrations (when ammonia is first exposed to the SCR device), the rapid early decrease in both NO and NO2 occurs because they are at equal proportions (NO/NOx=0.5). When NO or NO2 is consumed (NO/NOx≠0.5), leaving less of the other available for reaction within the SCR device, the reaction rate slows. Thus, these figures illustrate the fast reaction of NO and NO2 (when both are available) with ammonia, versus the slow reaction of NO or NO2 (when only one component is available) with ammonia.

In terms of specific NO/NO2 ratios, NOx is the sum of NO+NO2. The SCR device's reaction is fast when NO/NO2 equals 1 (which is the same as when NO/NOx equals 0.5), which makes the total NOx reduction of the SCR device fast.

Over time, the NO/NO2 ratio changes, and there is a higher proportion of NO2. Referring to FIG. 2, when the NO/NO2 ratio decreases, NOx reduction slows significantly. Over 1000 seconds lapse from 75% to 95% conversion. At 4000 seconds, ammonia is turned off. Conversion of NO2 ceases first. The amounts of NO and NO2 reach steady state as all ammonia is consumed.

FIG. 3 illustrates the ammonia (NH3) in the exhaust that is emitted from the SCR device. As the NO and NO2 concentrates are reduced, NH3 is not reacted and "slips" out from the SCR device.

Figure 4:
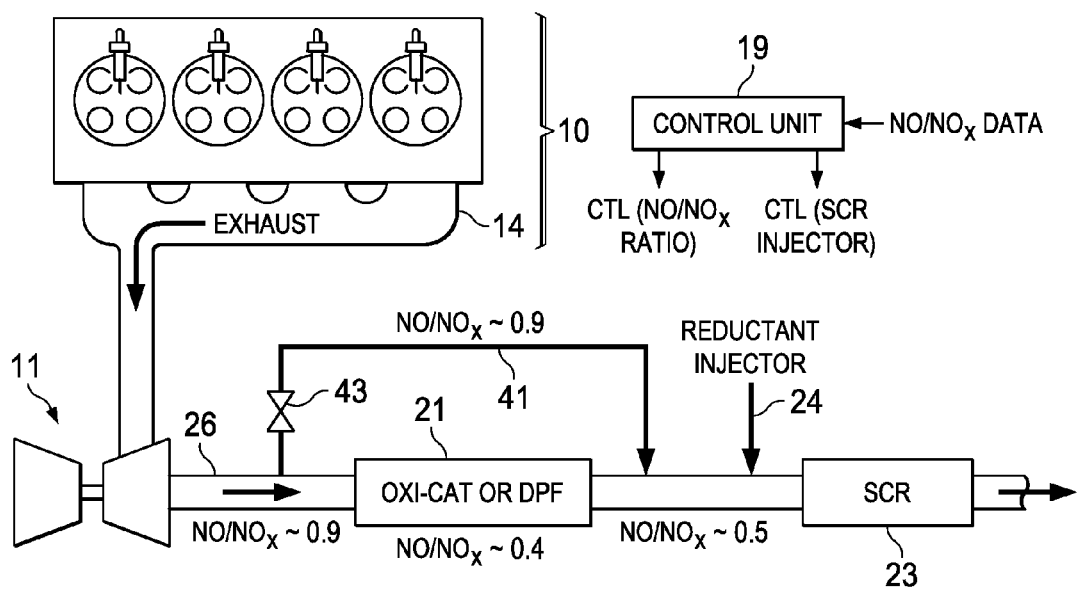
FIG. 4 illustrates a first embodiment of an SCR-based exhaust aftertreatment system with control of the NO/NOx ratio into the SCR.
Figure 5:
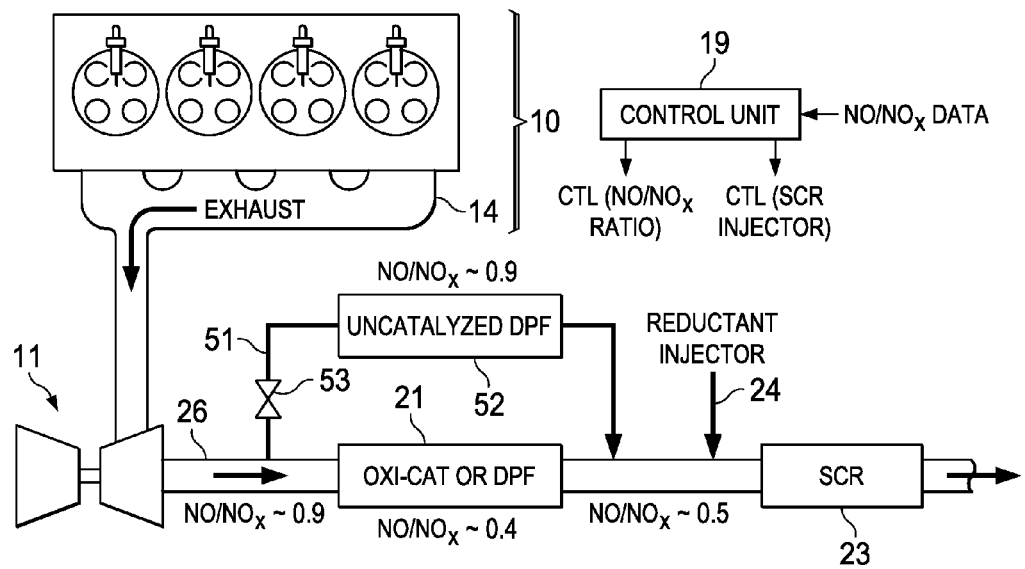
FIG. 5 illustrates a second embodiment of an SCR-based exhaust aftertreatment system with control of the NO/NOx ratio into the SCR.
Figure 6:
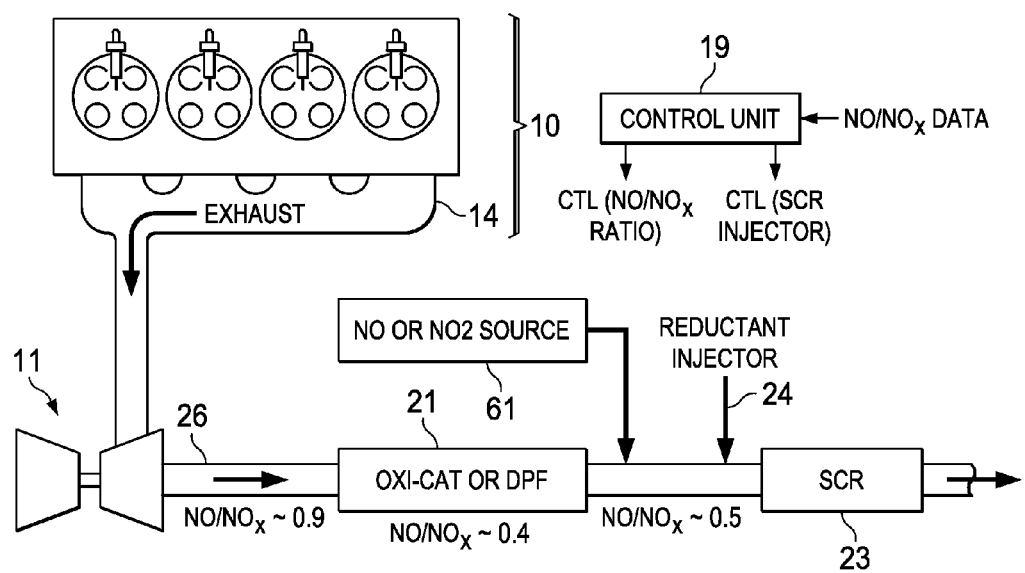
FIG. 6 illustrates a third embodiment of an SCR-based exhaust aftertreatment system with control of the NO/NOx ratio into the SCR.

FIGS. 4-6 illustrates an engine 10, whose exhaust is delivered to various embodiment of an SCR-based exhaust aftertreatment system with control of the NO/NOx ratio. In the illustrative embodiment, engine 10 is a diesel engine of an automotive type vehicle, and is an air-boosted engine having a turbocharger 11. The engine's intake air is compressed by the turbocharger's compressor, which is mechanically driven by its turbine. Exhaust gas is discharged from the engine's exhaust manifold 14 to a main exhaust line.

The flow of exhaust through the exhaust aftertreatment system is indicated by the arrows. The main exhaust line is equipped with an upstream particulate emissions (PM) control device 21, such as an oxidation catalyst (oxi-cat) or catalyzed diesel particulate filter (DPF). Next (downstream) is a selective catalytic reduction (SCR) device 23. As explained below, the various embodiments each also include means (such as a bypass line or NO/NO2 source) for controlling the NO/NOx ratio into SCR device 23.

The PM control device 21 (such as an oxidation catalyst or DPF) treats exhaust emissions, and in particular, PM emissions in the exhaust. The term "diesel particulate filter" as used herein is not limited to filters used for diesel engines, and may include various types of particulate filters. If a DPF is used, it may be catalyzed, which permits it to passively regenerate. The regeneration results from chemical reaction of the DPF catalyst, which raises the temperature within the DPF high enough to oxidize PM collected in the DPF. Regardless of which device is used (oxidation catalyst or DPF), one effect of either is to increase the amount of NO2 in the exhaust stream. This reduces the NO/NOx ratio.

As stated above, SCR 23 uses a catalyst to convert NOx into nitrogen and water. A reductant is added to the exhaust gas by means of an injector 24 upstream the entrance to the SCR device 23. SCR device 23 may be manufactured from various ceramic materials used as a carrier, such as titanium oxide. The catalytic components are usually oxides of base metals (such as vanadium and tungsten), zeolites, or various precious metals.

Control unit 19 may be processor-based, programmed to control various aspects of engine operation. In general, control unit 19 may be implemented with various controller devices known or to be developed. Further, control unit 19 may be part of a more comprehensive engine control unit that controls various other engine and/or emissions devices.

Control unit 19 is programmed to receive input signals and provide control signals, to implement the method described below. In particular, control unit 19 may receives one or more measurement signals that allow it to determine the current NO/NOx ratio of the engine-out exhaust or the exhaust entering the SCR device or both. The NO or NO2 content of the exhaust could be directly measured or estimated from other measured data. It delivers control signals that allow control of the NO/NOx ratio, such as by controlling how much exhaust is bypassed around the PM control device 21 or is introduced from a source 61. It may also perform other tasks related to the aftertreatment system, such as control of the injection of reductant for the SCR device 23.

It should also be understood that in the simplest embodiments, the bypass line 41 or 51 could be configured to carry exhaust around the PM control device 21 with no additional control necessary.

FIGS. 4-6 each further show NO/NOx ratios at various locations within the exhaust aftertreatment system. In a typical diesel engine, most of the engine-out NOx emissions comprises NO. In other words, diesel engines produce low concentrations of NO2. In the examples of FIGS. 4-6, the engine-out NO/NOx ratio is approximately 0.9.

As shown, the PM control device 21 converts a considerable amount of the NO to NO2. This increases the NO2 concentration substantially. In the examples of FIGS. 4-6, the output exhaust stream from the PM control device 21 has a NO/NOx ratio of approximately 0.4.

Referring in particular to FIG. 4, the aftertreatment system has a bypass line 41 that bypasses the PM control device 21. Bypass line 41 allows a portion of the engine-out exhaust to be diverted around the PM control device 21 and to re-enter the exhaust stream upstream the SCR device 23. The bypassed exhaust has a NO/NOx ratio of approximately 0.9 (the same as the engine-out exhaust). This bypassed exhaust combines with the exhaust treated by the PM control device 21 prior to entry into the SCR device 23.

By bypassing an appropriate portion of the exhaust stream around the PM control device 21, the NO/NOx ratio of the exhaust entering SCR device 23 can be maintained at a desired ratio. It is expected that for today's SCR devices that ratio will be approximately 0.5.

A bypass valve 43 could be used to vary the amount of exhaust gas that is to bypass PM control device 21. The precise NO/NOx ratio entering the SCR device 23 could be maintained at a constant ratio or varied according to current engine conditions, exhaust temperature or content, etc.

The embodiment of FIG. 5 is similar to that of FIG. 4, having a bypass line 51. However, in this embodiment an uncatalyzed DPF 52 is placed on the bypass line 51. The DPF 52 is configured to not change, or to change to a lesser extent, the NO/NOx ratio of the exhaust gas in the bypass line 51, which re-enters the exhaust stream downstream the PM control device 21. It mixes with exhaust gas from the PM control device 21, to result in an SCR feedgas having a desired NO/NOx ratio.

Referring to FIG. 6, the NOx conversion efficiency of the SCR device 23 may increase enough for optimal NO/NO2 ratios that it would be acceptable to use an NO or NO2 source 61 to add either NO or NO2 to the exhaust between the PM control device 21 and the SCR device 23. If the engine is on a vehicle, source 61 is an on-board source. The desired result is an SCR feedgas having an optimal NO/NOx ratio, here, approximately 0.5.

In this embodiment, NO or NO2 may be derived from an upstream source 61 that is richer in either species than the baseline (engine-out) SCR exhaust. In such circumstances, the SCR feedgas can be supplemented by the upstream source 61 to produce a final SCR feedgas with NO/NOx ratio closer to optimum than for the baseline feedgas. Although not expressly shown, the embodiments of FIGS. 4 and 5 could also have an external NO or NO2 source.

Each of these embodiments is based on mixing NO and NO2 to form a desired NO/NOx ratio for the feedgas to an SCR device 23. As discussed above, an optimum ratio is believed to be 0.5, in other words, equal parts NO and NO2. A generalized method of providing an optimum NO/NOx ratio involves determining the NO/NOx ratio downstream any emissions control device that is upstream the SCR device.

For controlling the NO/NOx ratio, measurement of NO and NO2 using special sensors (not shown) would be a "direct" way to provide control unit 19 with appropriate input data. However, lacking such sensors, the method may be implemented by programming control unit 19 to perform a model-based control strategy. Various input "NO and NO2 input data" can be used to estimate the current NO/NOx ratio. Two or more of the three parameters (NO, NO2, NOx) may be measured or estimated to determine the NO/NOx ratio.

Based on the NO/NOx ratio upstream the SCR device, more NO or more NO2 can be added to the feedgas delivered to the SCR device. Any of the above-described embodiments may be used to achieve a desired NO/NOx ratio. Control unit 19 may be programmed to receive the current NO/NOx ratio, to compare the current ratio to a stored optimum ratio, and to generate appropriate control signals for adjusting the NO or NO2. Such control signals might include control of a valve installed on the bypass lines of the embodiments of FIGS. 4 and 5, or control of the amount of NO or NO2 provided in the embodiment of FIG. 6. In practice, control unit 19 (which may be part of a larger engine control system) will most likely use models and sensors in combination, and provide "on-board diagnostic" capability.

What is claimed is:

1. A method of treating exhaust from an engine, the exhaust containing NOx, the NOx comprising at least nitrogen monoxide (NO), comprising:
   providing an exhaust aftertreatment system having at least the following devices arranged in the following order on an exhaust line: a catalyzed particulate filter and a selective reduction catalyst (SCR);
   wherein the catalyzed particulate filter receives engine-out exhaust having a first NO/NOx ratio and emits exhaust having a second NO/NOx ratio;
   bypassing a portion of the engine-out exhaust around the catalyzed particulate filter;
   reintroducing the bypassed portion of exhaust to the exhaust stream upstream the SCR device;
   wherein the bypassed portion of exhaust mixes with the exhaust from the catalyzed articulate filter to provide exhaust having a third NO/NOx ratio greater than the second NO/NOx ratio.

2. The method of claim 1, wherein the bypassing step is performed using a bypass line that diverts a portion of the engine-out exhaust immediately upstream the catalyzed particulate filter and reintroduces the bypassed exhaust immediately downstream the catalyzed particulate filter.

3. The method of claim 1, further comprising treating the bypassed exhaust with a particulate filter.

4. The method of claim 1, wherein the third NO/NOx ratio is approximately 0.5.

5. A method of treating exhaust from an engine, the exhaust containing NOx, the NOx comprising at least nitrogen monoxide (NO), comprising:
   providing an exhaust aftertreatment system having at least the following devices arranged in the following order on an exhaust line: a PM control device and a selective reduction catalyst (SCR);
   wherein the PM control device receives engine-out exhaust having a first NO/NOx ratio and emits exhaust having a second NO/NOx ratio;
   storing a source of NO or NO2;
   introducing NO or NO2 from the source to the exhaust line downstream the PM control device and upstream the SCR device;
   wherein the NO or NO2 mixes with the exhaust from the PM control device to provide exhaust having a third NO/NOx ratio.

6. The method of claim 5, wherein the PM control device is an oxidation catalyst.

7. The method of claim 5, wherein the PM control device is a catalyzed particulate filter.

8. The method of claim 5, wherein the third NO/NOx ratio is approximately 0.5.

9. A system for treating exhaust from an engine, the exhaust containing NOx, the NOx comprising at least nitrogen monoxide (NO), comprising:
   an exhaust aftertreatment system having at least the following devices arranged in the following order on an exhaust line: a catalyzed particulate filter and a selective reduction catalyst (SCR);
   wherein the catalyzed particulate filter receives engine-out exhaust having a first NO/NOx ratio and emits exhaust having a second NO/NOx ratio;
   a bypass line for bypassing a portion of the engine-out exhaust around the catalyzed particulate filter and reintroducing the bypassed portion of exhaust to the exhaust stream upstream the SCR device;
   wherein the bypassed portion of exhaust mixes with the exhaust from the catalyzed particulate filter to provide exhaust having a third NO/NOx ratio greater than the second NO/NOx ratio.

10. The system of claim 9, wherein the bypass line diverts a portion of the engine-out exhaust immediately upstream the catalyzed particulate filter and reintroduces the bypassed exhaust immediately downstream the catalyzed particulate filter.

11. The system of claim 9, further comprising a particulate filter installed on the bypass line.

12. The system of claim 9, wherein the third NO/NOx ratio is approximately 0.5.

* * * * *